United States Patent
Bheemarasetty et al.

(10) Patent No.: US 12,267,534 B2
(45) Date of Patent: Apr. 1, 2025

(54) SYSTEM AND METHOD FOR INCREASING CONTENT INSERTION OPPORTUNITIES VIA MACHINE LEARNING

(71) Applicant: Verizon Patent and Licensing Inc., Basking Ridge, NJ (US)

(72) Inventors: Ramesh Naidu Bheemarasetty, Little Elm, TX (US); Madhavan Sivathanu Pillai, Little Elm, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/888,816

(22) Filed: Aug. 16, 2022

(65) Prior Publication Data
US 2024/0064345 A1 Feb. 22, 2024

(51) Int. Cl.
H04N 21/20 (2011.01)
H04N 21/234 (2011.01)
H04N 21/2385 (2011.01)
H04N 21/466 (2011.01)

(52) U.S. Cl.
CPC ... H04N 21/23424 (2013.01); H04N 21/2385 (2013.01); H04N 21/4662 (2013.01)

(58) Field of Classification Search
None
See application file for complete search history.

(56) References Cited

U.S. PATENT DOCUMENTS

| | | | |
|---|---|---|---|
| 11,245,935 B1* | 2/2022 | Shams | H04N 21/812 |
| 11,665,076 B1* | 5/2023 | Love | H04W 4/24 |
| | | | 709/224 |
| 2011/0016479 A1* | 1/2011 | Tidwell | H04N 21/25891 |
| | | | 725/9 |
| 2016/0165277 A1* | 6/2016 | Kirillov | H04N 21/25891 |
| | | | 725/14 |
| 2017/0353744 A1* | 12/2017 | Kunisetty | H04N 21/266 |
| 2018/0160196 A1* | 6/2018 | Wahl | H04N 21/2668 |
| 2018/0189826 A1* | 7/2018 | Xu | G06Q 30/0254 |
| 2018/0276479 A1* | 9/2018 | Harris | G06N 5/02 |
| 2018/0376197 A1* | 12/2018 | Gonzalez | H04N 21/44016 |
| 2019/0349619 A1* | 11/2019 | Hou | H04N 21/2407 |
| 2020/0053591 A1* | 2/2020 | Prasad | H04W 28/0268 |
| 2020/0059680 A1* | 2/2020 | Lechner | H04N 21/812 |
| 2020/0145720 A1* | 5/2020 | Krauss | H04N 21/812 |
| 2022/0060904 A1* | 2/2022 | Das | H04W 48/18 |
| 2022/0070537 A1* | 3/2022 | Younessian | H04N 21/4662 |
| 2022/0321628 A1* | 10/2022 | Rhyu | H04L 65/60 |

* cited by examiner

Primary Examiner — Mushfikh I Alam

(57) ABSTRACT

The present teaching relates to method, system, medium, and implementations for increasing content insertion opportunities. A prediction input is received that characterizes utilization of content stream utilization channels (CSUCs). Schedule parameters are automatically predicted for the prediction input using prediction models obtained via machine learning based on grouped historic data related to CSUCs, where grouping is based on an operational mode in which the prediction models operate. Using the predicted schedule parameters, insertion opportunity may be identified with respect to CSUCs and insertion schedules are generated specifying insertions of content streams into identified CSUCs at respective insertion times.

20 Claims, 13 Drawing Sheets

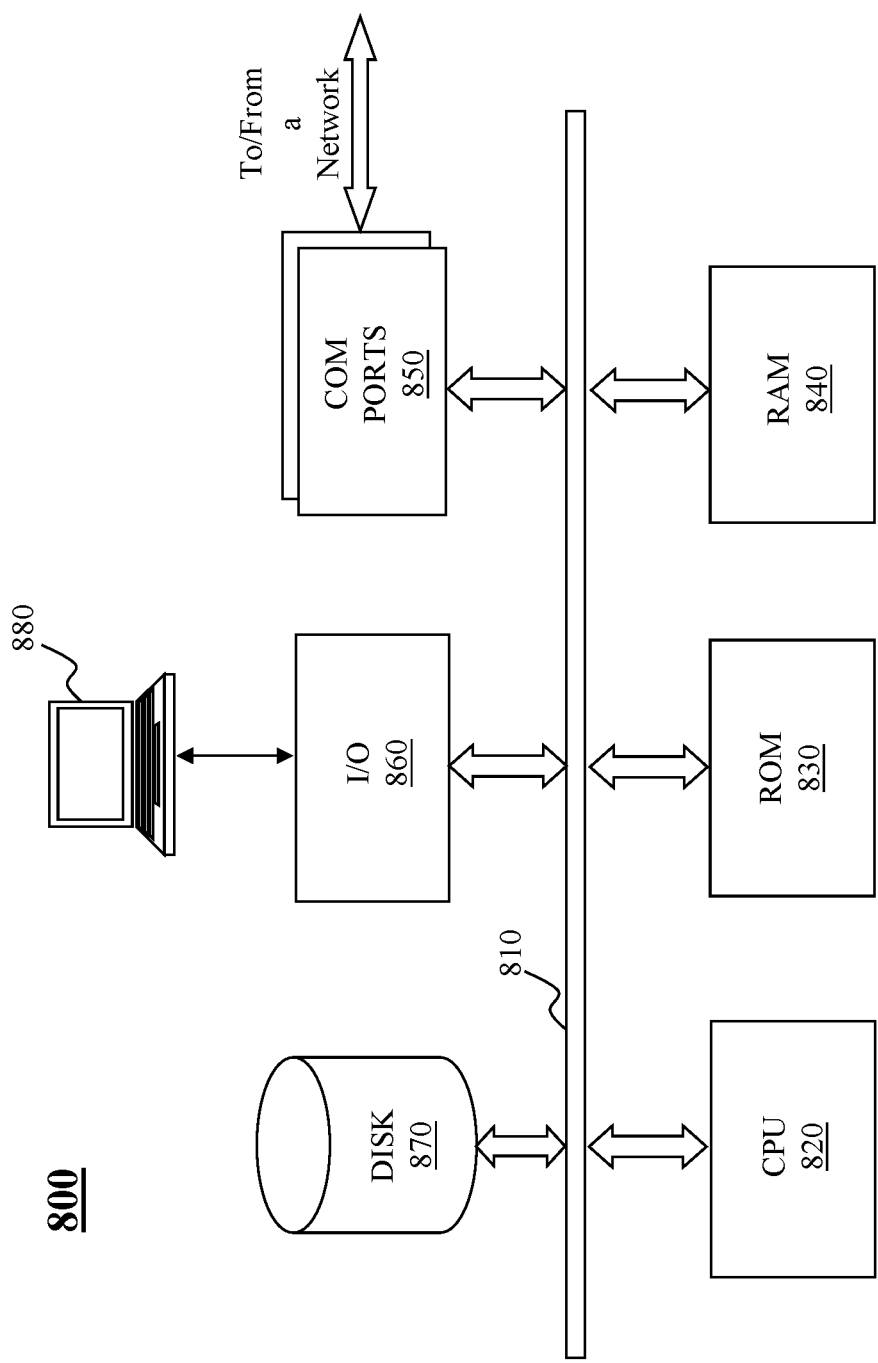

SYSTEM AND METHOD FOR INCREASING CONTENT INSERTION OPPORTUNITIES VIA MACHINE LEARNING

BACKGROUND

With the development of the Internet and the ubiquitous network connections, a large percent of content is nowadays made digital so that it is can be delivered online. There are different modes used in delivering digital content. In many situations, different pieces of digital content may be combined, either in space or in time, so that a viewer may receive composite content. For example, a web page may include contents from different sources, e.g., some may be native, some may be from another website, and some may correspond to advertisements. In addition, different content streams may be combined timewise so that content streams from different sources may be delivered to a destination. One example is broadcast programs or on-demand movies may be delivered to different households in combination with content from other source such as local news or advertisements. Content to be combined with a program may be inserted into some content stream delivery channels with a specified start play time so that at the specified start play time, the inserted content is pulled from a specified channel for delivery (streaming). When the inserted content is delivered, the program resumes.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is an illustrative diagram of an exemplary computing device architecture that may be used to realize a specialized system implementing the present teaching in accordance with various embodiments.

DETAILED DESCRIPTION OF EXAMPLE EMBODIMENTS

Figure 1:
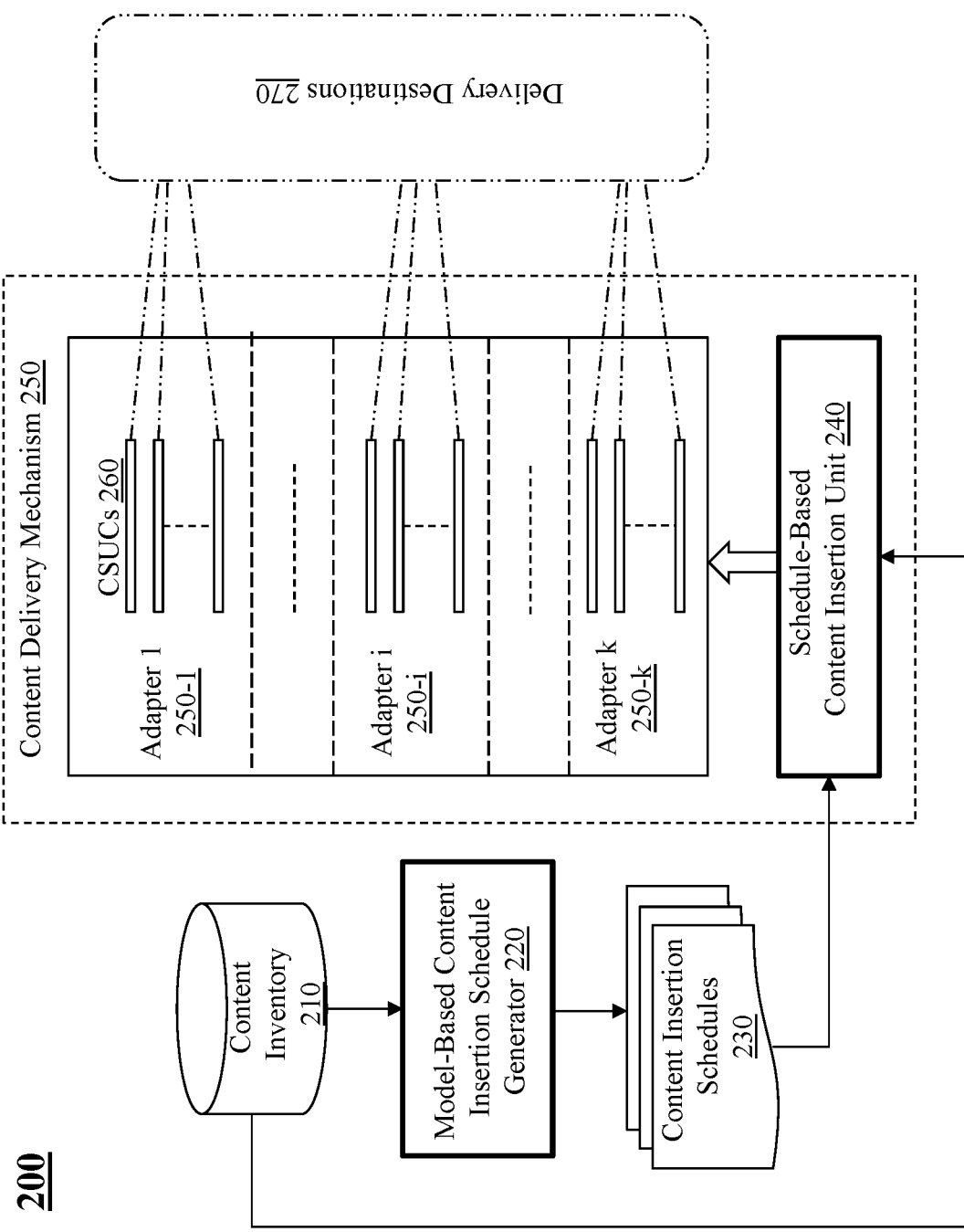
FIG. 1 depicts an exemplary framework for enhancing utilization of content stream channels by inserting content at predicted unutilized spots via content insertion schedules, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Content streams may be delivered to destinations, e.g., households, on a region-by-region basis. To do so, each region may be configured with multiple adapters, each of which may be configured with one or more content stream utilization channels (CSUC). CSUCs associated with each adapter may be used for content insertions with each piece of inserted content having a start time so that the content inserted for that time is to be streamed to a content recipient at the indicated start time. Content may be delivered via a regional program combined with content from other sources (such as advertisements) according to some local schedules which specify the timings of insertions of content from other sources in CSUCs of relevant adapters associated with the regions. With this mechanism, when the regional program is delivered, the insertion times are observed so that at each of the insertion times, the content to be delivered may be switched to the inserted content in the CSUC and when the inserted content is delivered, the control switches back to the regional program. A CSUC is often not fully utilized, i.e., some positions in the CSUC are without any content inserted. There is a need to maximize the utilization of CSUCs without collision.

The present teaching improves the current state of the industry in content delivery by increasing utilization of content stream channels. In some embodiments, available content insertion opportunities in different content stream channels are automatically predicted in accordance with one or more prediction models derived via machine learning based on historic data. In some embodiments, such automatically predicted content insertion opportunities may also be determined by minimizing potential collisions which may be predicted based on collision prediction models with respect to content stream channels obtained via machine learning using historic collision data.

Each of such identified content insertion opportunities is associated with a delivery time with respect to a content stream channel in a region. To utilize the identified content insertion opportunities, content insertion schedules are automatically generated so that insertions of content in different content stream channels may be implemented and content scheduled to be delivered at these insertion spots may be delivered via different specified content stream channels.

In one example, a method for increasing content insertion opportunities. When a prediction input characterizing utilization of content stream utilization channels (CSUCs) is received, schedule parameters are automatically predicted based on the prediction input via prediction models obtained via machine learning based on historic data related to CSUCs and grouped based on an operational model in which the prediction models operate. Using the predicted schedule parameters, at least one insertion opportunity is identified with respect to CSUCs and corresponding insertion schedules are generated instructing insertions of content streams into identified CSUCs at respective insertion times.

In another example, a system is disclosed for increasing content insertion opportunities and includes a model-based schedule parameter predictor and a content insertion schedule generator. The model-based schedule parameter predictor is configured for receiving a prediction input that characterizes utilization of CSUCs and predicting automatically one or more schedule parameters based on the prediction input via one or more prediction models obtained via machine learning based on historic data related to CSUCs and grouped based on an operational mode in which the prediction models operate. The content insertion schedule generator is configured for identifying, based on the one or more schedule parameters, at least one insertion opportunity with respect to the CSUCs and generating, for each of the at least one insertion opportunity, a corresponding insertion schedule specifying insertion of a content stream into a selected CSUC at an insertion time.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

An implementation example is a machine-readable, non-transitory and tangible medium having information recorded thereon for increasing content insertion opportunities. When a prediction input characterizing utilization of CSUCs is received, schedule parameters are automatically predicted for the prediction input via prediction models obtained via machine learning based on historic data related to CSUCs and grouped based on an operational mode in which the prediction models operate. Using the predicted schedule parameters, at least one insertion opportunity is identified with respect to content stream utilization channels (CSUCs) and corresponding insertion schedules are generated instructing insertion of content streams into identified CSUCs at respective insertion times.

FIG. 1 depicts an exemplary framework 200 for enhancing utilization of content stream channels via increased content insertions at automatically predicted unutilized spots via content insertion schedules, in accordance with an embodiment of the present teaching. In this exemplary framework 200, an exemplary regional content delivery mechanism 250 is shown to include k adapters, including adapter 250-1 to adapter 250-k. Each of the adapters is associated with one or more CSUCs 260, each of which is utilized to deliver content streams to various delivery destinations 270 in the region. Content streams may be of any data streams that convey information, including, but not limited to, a movie, a documentary, a show, an advertisement, or the like. A destination to receive content delivery may include, but not limited to, a household, a building, a room in a building, via a television, a computer, a device, a phone, or any other type of physical device of any form factor.

Content to be delivered to the destinations 270 may be transmitted to the destinations as content streams inserted in the CSUCs associated with different adapters in the region. Content streams from CSUCs may be delivered to destinations in an interleaved fashion with content from other sources, such as broadcast content in a TV network or local news content. For instance, in a broadcast network, the broadcast content may be delivered to destinations in a manner that is combined with the content streams from a CSUC. One example is when the content streams inserted in the CSUC correspond to advertisements, the broadcast content may be delivered to destinations such as households with various breaks and content streams inserted in the CSUC may be delivered to the destinations during such breaks.

The content streams may be transmitted to the destinations via network connections (not shown), which may be a single network or a combination of different networks. For example, such a network may be a local area network (LAN), a wide area network (WAN), a public network, a private network, a proprietary network, a Public Telephone Switched Network (PSTN), the Internet, a wireless network, a virtual network, or any combination thereof. Such a network or any portions thereof may be a 4G network, a 5G network, or a combination thereof. The network may also include various network access points, e.g., wired, or wireless access points such as base stations or Internet exchange points, through which a particular destination in 270 may connect to the network in order to request certain content or the content delivery mechanism 250 may transmit information to a specific destination. The content streams may be delivered to the destinations 270 via the network as bitstreams encoded in accordance with certain industrial standards, such as MPEG4 or H.26x, and the network may be configured to support the transport of such encoded bitstreams.

Figure 2:
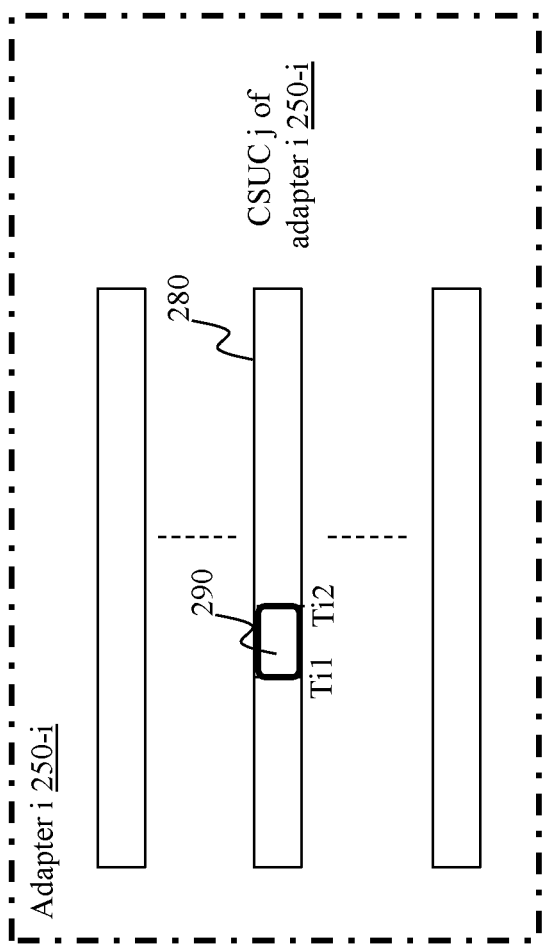
FIG. 2 provides an exemplary content insertion schedule.

The content delivery mechanism 250 may also include a schedule-based content insertion unit 240, which inserts, according to content insertion schedules stored in 230, certain content streams into specified CSUCs in order for the content streams to be delivered to different destinations according to the content insertion schedules. FIG. 2 provides an exemplary content insertion schedule, according to an embodiment of the present teaching. In some embodiments, a content insertion schedule is constructed to specify a content insertion position in a CSUC, and the schedule provides specific information identifying an adapter and a specific CSUC associated with the adapter and specifying a start time and an end time with respect to the CSUC for the content to be delivered at the start time via the specific CSUC. FIG. 2 provides an example content insertion schedule: [adapter i, CSUC j, start-time Ti1, end-time Ti2, . . . ]. This exemplary content insertion schedule indicates that content stream is going to be inserted in CSUC j in adapter i at start time Ti1 and ends at time Ti2. This is shown in FIG. 2, where adapter i 250-$i$ has a plurality of CSUCs and CSUC j 280 is the content channel for the insertion and the insertion 290 starts at timing Ti1 and ends at timing Ti2. With this example, when content is delivered to the destinations 270, at time Ti1, the content delivery mechanism 250 delivers content streams inserted between Ti1 and Ti2 in CSUC 280 in adapter i to the destinations 270.

Referring back to FIG. 1, content streams are inserted into the CSUCs according to the content insertion schedules stored in 230. The content insertion schedules are generated by a model-based content insertion schedule generator 220 based on the content inventory stored in 210. Such content insertion schedules are generated to explore the unutilized insertion opportunities in CSUCs associated with various adapters and enhance the utilization of such unused insertion opportunities. The model-based content insertion schedule generator 220 is provided for automatically identifying available insertion opportunities in CAUCs and leveraging such automatically identified insertion opportunities by scheduling, for each of such identified insertion opportunities, a content insertion schedule in 230. As discussed herein, the content insertion schedules in 230 may then be used by the schedule-based content insertion unit 240 to insert content streams in CSUCs so that the content delivery mechanism 250 is able to cause the inserted content streams to be delivered, across the network, to different destinations. In some embodiments, the content insertion opportunities associated with the CSUCs are explored by predicting, using various prediction models, parameters that are associated with available content delivery resources in CSUCs. As will be shown below, such predictions of available resources may be achieved based on one or more prediction models that are created via machine learning based on knowledge represented by historic data. Details related to the model-based content insertion schedule generator 220 are provided herein with respect to FIGS. 3A-6B.

Figure 3A:
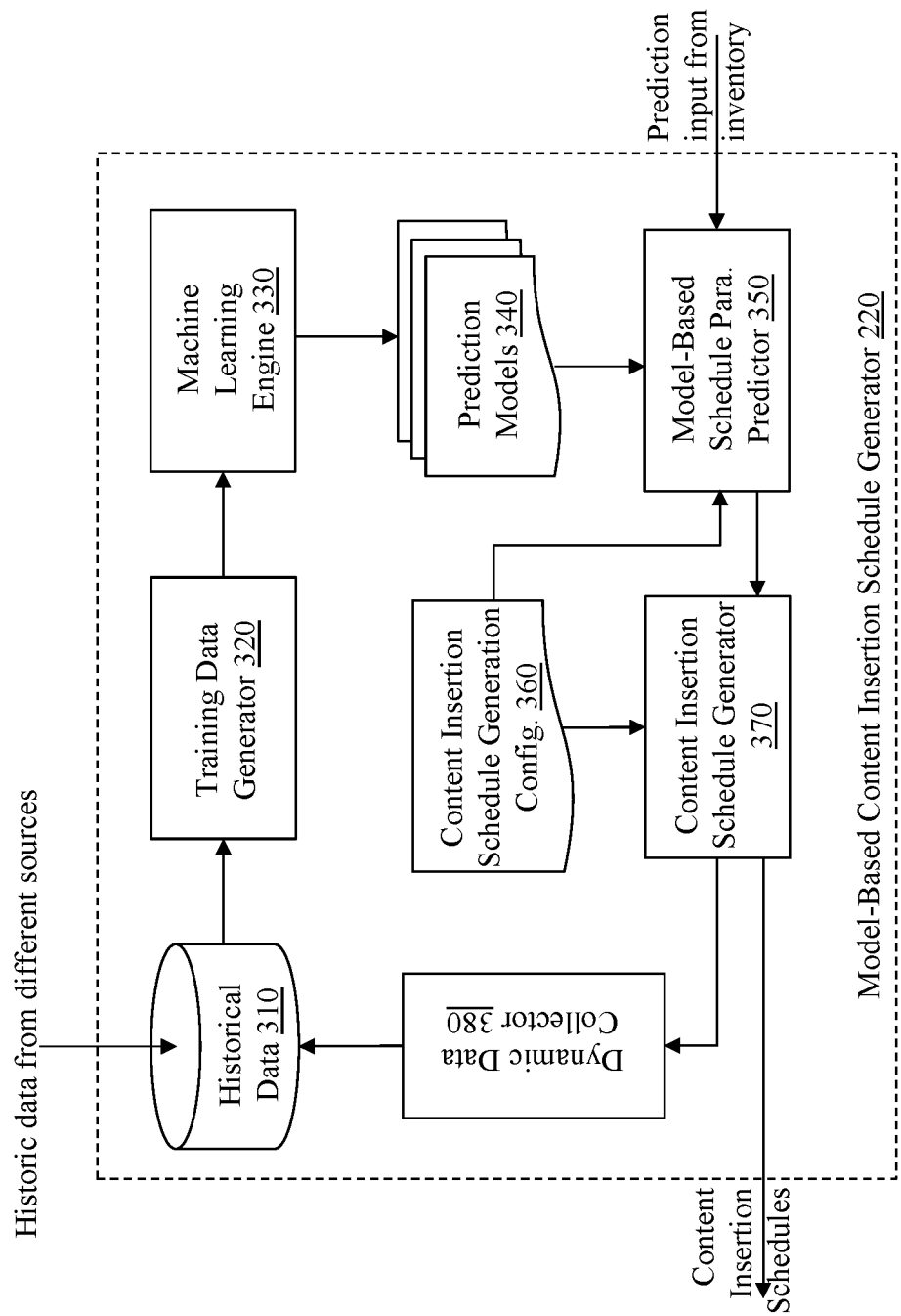
FIG. 3A depicts an exemplary high level system diagram of a model-based content insertion schedule generator, in accordance with an embodiment of the present teaching.

FIG. 3A depicts an exemplary high level system diagram of the model-based content insertion schedule generator 220, in accordance with an embodiment of the present teaching. In this illustrated embodiment, the model-based content insertion schedule generator 220 includes two portions, one for creating one or more prediction models 340 for predicting content insertion opportunities in CSUCs and the other portion for using the prediction models to identify by prediction content insertion spots in CSUCs and generating accordingly content insertion schedules for the identified content insertions. The portion for creating prediction models 340 comprises a training data generator 320 and a machine learning engine 330. To create prediction models 340 for automatically exploring the available insertion opportunities in CSUCs, the machine learning engine 330 uses training data generated based on historic data by the training data generator 320.

Figure 3B:
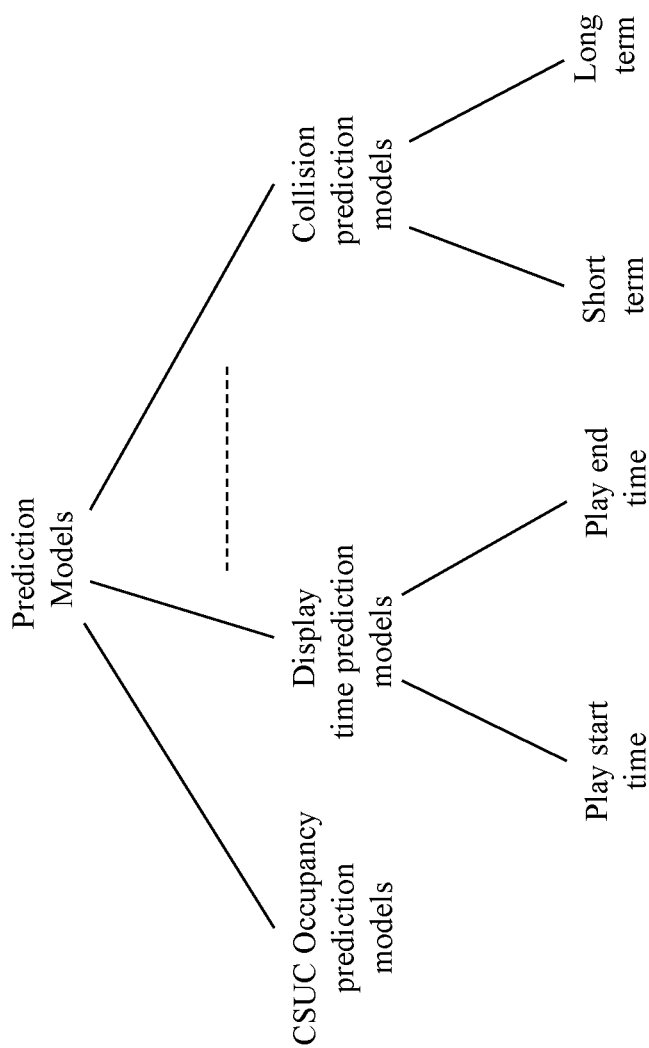
FIG. 3B shows exemplary types of prediction models used to predict unutilized spots in CSUCs, in accordance with an exemplary embodiment of the present teaching.

In the operation of the first portion of the model-based content insertion schedule generator 220, the prediction models are to be created via machine learning. The prediction models 340 may include different and separate prediction models, each of which may be learned from historic data to predict a certain aspects or parameters related to available content insertion opportunities. FIG. 3B shows exemplary types of prediction models used to predict insertion position in CSUCs, in accordance with an exemplary embodiment of the present teaching. As illustrated, prediction models 340 may include models for predicting CSUC occupancy, models for predicting content display time, and models for predicting collisions. The CSUC prediction models may include specific models for, predicting CSUC occupancies in a specific region (region-based models) or even adapter (adapter-based models). The CSUC prediction models may also include models trained for predicting CSUC occupancy of different time frames. For instance, some CSUC models may be trained for making daily predictions and some may be trained for making weekly predictions, etc. The display time prediction models may include models for predicting the play start time and models for predicting the play end time. The collision prediction models may include models for predicting short term collisions (e.g., daily) and models for predicting long term collisions (e.g., weekly). Different models may be trained using different training data generated based on appropriate subsets of the historic data. The trained models are stored in 340 and appropriate models may be retrieved for predicting content insertion related parameters in appropriate situations. For instance, in a particular setting, the prediction may be set to be daily and as such, appropriate models trained for daily predictions may be invoked to make the needed daily predictions. Although FIG. 3B shows exemplary types of prediction models for predicting different types of insertion related parameters, they are merely for illustration instead of as limitations. Prediction models may also be trained based on historical data for predicting other types of insertion related parameters. Such other types of prediction models are all within the scope of the present teaching.

To facilitate the machine learning, historic data from different sources may be gathered and stored in a historic data storage 310. In some embodiments, such historic data may be collected from the network as contemplated herein that may represent relevant information in content stream delivery to destinations. In some embodiments, such historic data may also be collected from third party information consolidators. In some embodiments, such historic data may be collected dynamically so that continuous feed of such data may be used by the machine learning engine 330 to continually update the prediction models 340 so that such prediction models may be made adaptive. In this illustrated embodiment as shown in FIG. 3A, a dynamic data collector 380 is provided for continually collecting content delivery information based on insertions schedules (that cause physical content delivery in the network to destinations) so that such information may be fed back as ongoing dynamic data for adapting the prediction models to the most recent historic data. The collected historic data may include various types of information on, e.g., utilization of different CSUCs of different adapters in different geographical regions, start/end times of the content stream delivery to different destinations, and/or recorded collisions occurred at different spots in different CSUCs of adapters in different regions.

To the extent that some of such collected information may include data related to content delivery to households or individual devices linked to certain users, the description provided herein addresses technical implementations of the subject matter of the present teaching and is not intended to address non-technical considerations that may be implicated by any application of the subject matter of the present teaching in a product or service. For example, the laws of a jurisdiction may limit the use of all, or a portion of the technology described herein, and any product or service would be expected to comply with such laws. The description provided herein does not advocate (and should not be read as advocating) for or against any legal restriction that may be applicable.

To the extent the aforementioned implementations collect, store, or use personal information of individuals, groups, or other entities, it should be understood that such information shall be used in accordance with all applicable laws concerning personal information. The collect, storage, and use of such information can be subject to consent of the individual to such activity, for example, through the well-known "opt-in" or "opt-out" processes as can be appropriate for the situation and type of information. The collection, storage and use of personal information can be in an appropriately secure manner reflective of the type of information, for example, through various access control, encryption, and de-identification (e.g., anonymization) techniques for particularly sensitive information.

The historic data obtained from different sources may be processed before being used in order to derive the training data for machine learning. The processing to be applied may be determined based on, e.g., application needs. For example, if prediction models are to be derived for some specific geographical area, then it may be the case that only historic data from those related geographical area is applicable. In some embodiments, individual prediction models may be trained separately. For instance, prediction models for channel utilization, insertion (or start) time, and collisions may be obtained separately. In this case, appropriate training data for deriving each of these prediction models may differ and may be generated specifically for each. This may make the learning of each type of model more focused and accurate, and the learning process may be more efficient.

In some embodiments, training data for machine learning a channel utilization model may include data focusing on the aspect of channel utilization. In one example, training data to be used to learn a channel utilization prediction model may include historic data on, e.g., AdapterID, delivery quality indicator (SD/HD), year, quarter, month, day, week, day, hour, minute, etc. In another example, training data to be used to learn a start time prediction model may include different historic data on, e.g., ChannelID, StartTimeID, year, quarter, month, day, week, day, hour, break number, minute, etc. In yet another example, training data to be used to learn a collision prediction model may include also different historic data on, e.g., market ID or video hub office ID, Date, Service Group ID (that has 1-1 relationship with adapters), Channel Quality Indicator, Channel Name, hour, minute, a status indicator for an addressable delivery, Collisions, Collision ratio, etc. Such created training data for learning each type of prediction models may then be sent to the machine learning engine 330 to carry out the machine learning process to derive prediction models. Details related to the machine learning engine 330 and its exemplary operation are provided with respect to FIGS. 4A-4B.

In the operation of the second portion of the model-based content insertion schedule generator 220, the trained prediction models are used by the model-based schedule parameter predictor 350 to predict insertion schedule related parameters and then such predicted parameters are used by the content insertion schedule generator 370 to generate content insertion schedules. Details associated with the model-based schedule parameter predictor 350 and the content insertion schedule generator 370 as well as their exemplary operations are provided with respect to FIGS. 5A-5B and FIGS. 6A-6B, respectively.

Figure 3C:
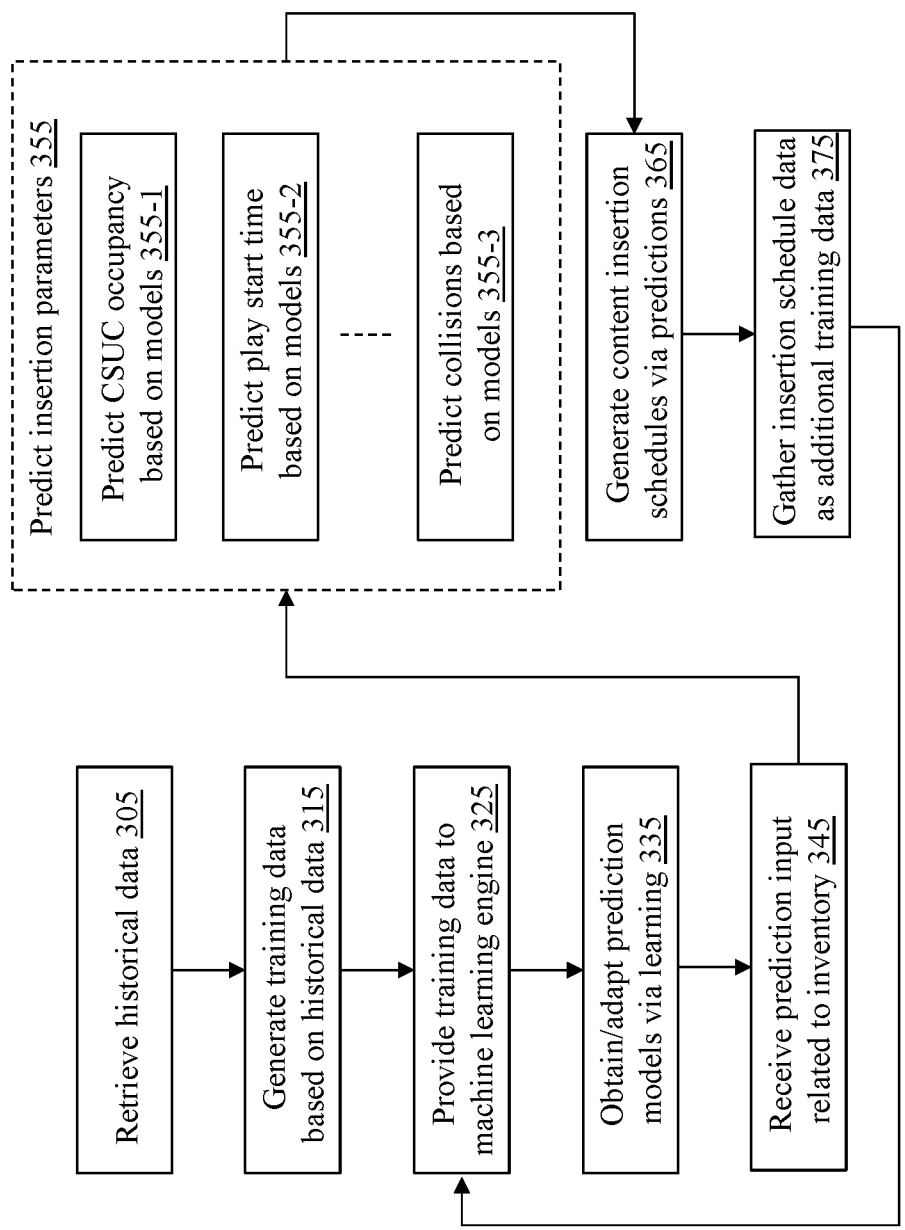
FIG. 3C is a flowchart of an exemplary process of a model-based content insertion schedule generator, in accordance with an embodiment of the present teaching.

FIG. 3C is a flowchart of an exemplary process of the model-based content insertion schedule generator 220, in accordance with an embodiment of the present teaching. To enable machine learning, historical data from one or more sources is gathered and stored in the historic data storage 310. Relevant historical data may then be retrieved, at 305, from the storage 310 by the training data generator 320, which then processes the retrieved historical data to generate, at 315, training data appropriate for machine learning. The generated training data is then provided to the machine learning engine 330 at 325. Upon receiving the training data, the machine learning engine 330 conducts a training process to obtain, at 335, the prediction models 340. Such obtained prediction models may then be used to predict insertion parameters based on a prediction input related to the inventory.

When the model-based schedule parameter predictor 350 receives, at 345, a prediction input, it may retrieve one or more prediction models to predict corresponding content insertion parameters. As discussed herein, there may be different prediction models for predicting different content insertion parameters. In each situation, different set of insertion parameters may be predicted depending on the needs of an application. Application dependent requirements may be specified in a content insertion schedule generation configuration stored in 360 and may be retrieved by the model-based schedule parameter predictor 350 in order to invoke needed prediction models to carry out appropriate predictions. For instance, some applications may rely on predicted start time to search for an available CSUC without using a predicted CSUC. Some applications may handle collision issues on-the-fly without needing collision predictions, etc. In some situations, the prediction models to be used to predict parameters may also depend on a prediction mode. For instance, in some applications, the predictions may be for daily schedule predictions (short term) while in other applications, the prediction may be for a weekly schedule so that it involves longer term predictions. Different prediction modes may require using prediction models that have been trained appropriately for the corresponding prediction modes.

Based on the specification retrieved from the content insertion schedule generation configuration from 360, the model-based schedule parameter predictor 350 may then proceed to predict, at 355, needed content insertion related parameters. As shown in FIG. 3C, the dotted box 355 for prediction includes a plurality of operations for predicting different content insertion related parameters, including, the operation of model-based prediction of CSUC occupancy at 355-1, the operation of model-based prediction of play start time at 355-2, . . . , and the operation of model-based prediction of potential collisions at 355-3. Although there is a sequential order among the numerals labeling these steps, once invoked, the invoked steps are not necessarily performed in a sequential order but instead can be independently carried out.

Based on predictions generated by the model-based schedule parameter predictor 350, the content insertion schedule generator 370 generates, at 365, corresponding content insertion schedules. In some embodiments, the content insertion schedules are generated in accordance with the content insertion schedule generation configuration specified in 360. As discussed herein, in some applications, the content insertion opportunities are predicted on a daily basis while in other applications, the content insertion opportunities may be predicted on a different time scale such as each week. These specified requirements from 360 may be used by the content insertion schedule generator 370 in order to generate, at 365, the needed content insertion schedules. The generated content insertion schedules may then be output to be stored in storage 230 (see FIG. 1) in order for the schedule-based content insertion unit 240 to insert content streams into different CSUCs in different adapters.

As discussed herein, the prediction models 340 may be continually updated using dynamically collected historic data. In some embodiments, the content insertion schedules generated for scheduling content insertion may be gathered, at 375, by the dynamic data collector 380 as historic data and stored in the historic data storage 310 as additional historic data, which may then be provided, at 325 (e.g., together with historic data from other sources), to the machine learning engine 330 in order to continuously adapt, at 335, the prediction models.

Figure 4A:
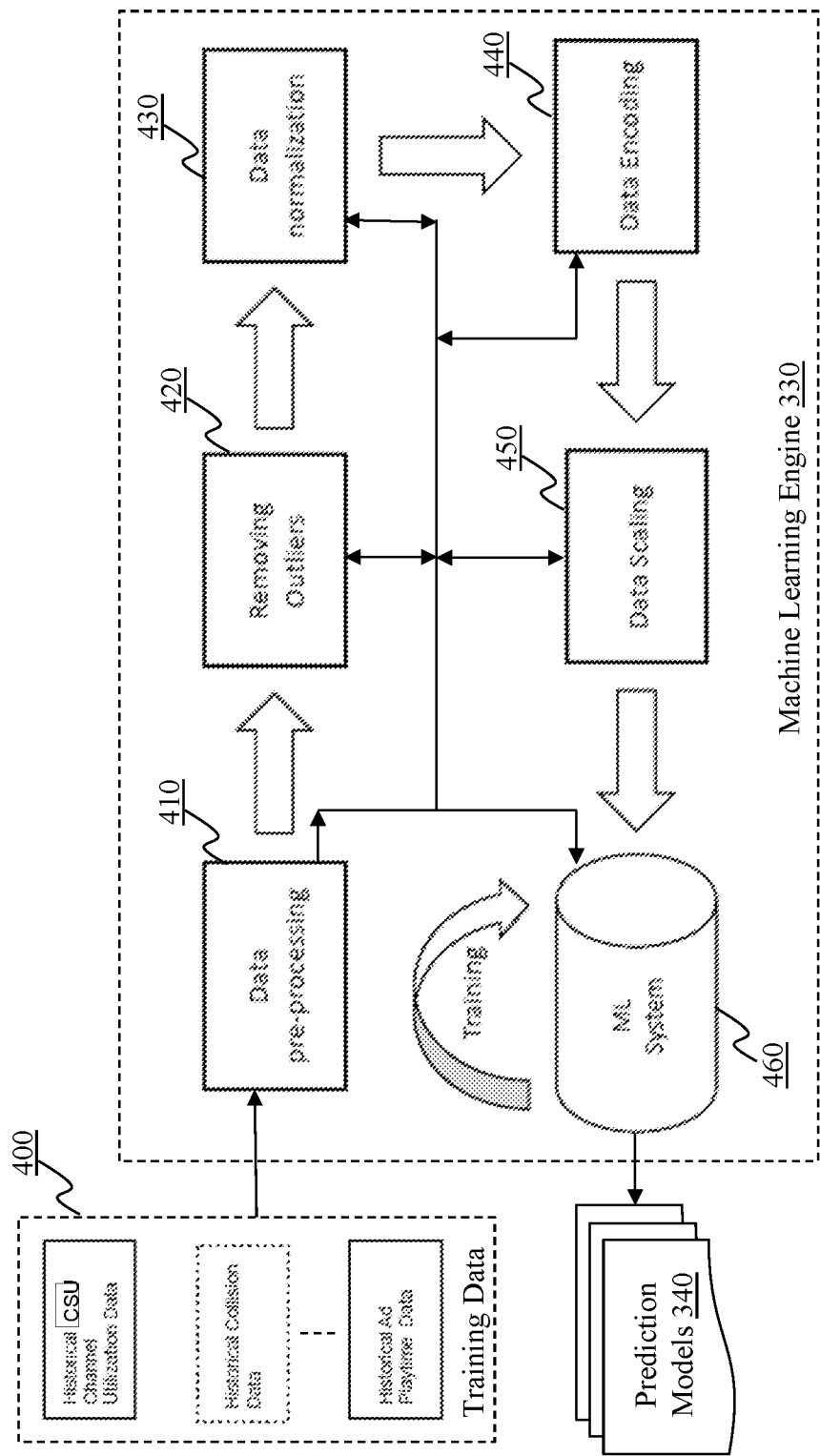
FIG. 4A depicts an exemplary high level system framework of a machine learning engine, in accordance with an exemplary embodiment of the present teaching.

FIG. 4A depicts an exemplary high level system framework of the machine learning engine 330, in accordance with an exemplary embodiment of the present teaching. In this framework, training data 400 generated by the training data generator 320 (see FIG. 3A) is sent to the machine learning engine 330 which produces the prediction models 340 as output. As illustrated, the training data 400 may include historic data associated with various content insertion related information, including, but not limited to, historic information on CSUC utilizations, on collisions, ..., and on content play start times.

The machine learning engine 330 in this illustrated embodiment comprises a data pre-processing unit 410, a plurality of training data enhancement modules, i.e., modules 420-450, for generating data appropriate for training, and a machine learning (ML) system 460 for carrying out the training process. The plurality of training data enhancement modules may include, but not limited to, a module 420 for removing outliers in the training data, a module 430 for normalizing the training data, a module 440 for encoding the training data, and a module 450 for scaling the training data. In operation, the pre-processed training data from module 410 may be transmitted directly to the ML system for machine learning or may be subject to additional processing by one or more of the modules 420-450 prior to being used for training. As shown in FIG. 4A, the pre-processed training data output from 410 may be sent to any of the modules 420-450 for additional processing and the output of any of the processing modules 420-450 may be sent either directly to the ML system 460 or to any other module for further processing.

The ML system 460 may be implemented based on different learning and modeling schemes. In some embodiments, regression modeling scheme such as random forest regression or fast tree regression approaches may be used. In some embodiments, artificial neural networks may be explored for learning. Different schemes may be used for training different prediction models. For example, regression modeling approach may be used for training models for predicting the CSUC occupancy and content play start time and recurrent neural network may be explored with respect to deriving models for predicting collisions. Different modeling schemes may have various hyper parameters that are to be iteratively tuned or adjusted during training. Appropriate modeling techniques available today or made available in the future may be utilized for learning the prediction models, according to the present teaching. It should be noted that although these example modeling themes are discussed herein, they are for illustration purpose and are not to be used as limitations to the present teaching.

Figure 4B:
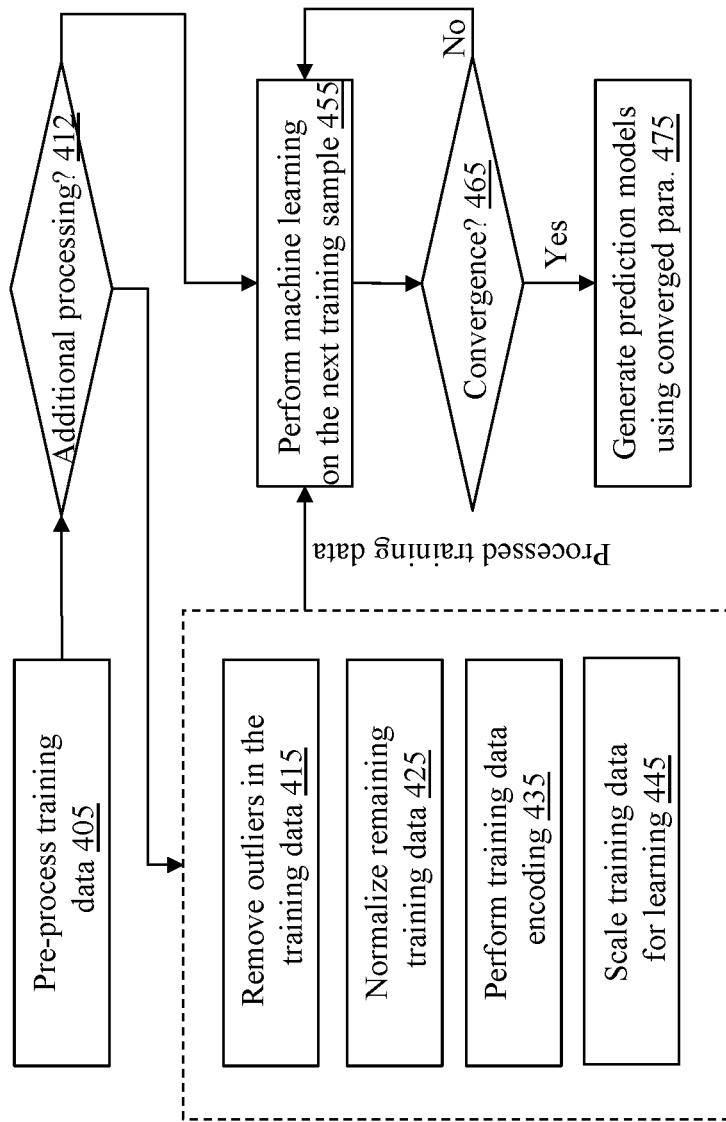
FIG. 4B is a flowchart of an exemplary process of a machine learning engine, in accordance with an embodiment of the present teaching.

FIG. 4B is a flowchart of an exemplary process of the machine learning engine 330, in accordance with an embodiment of the present teaching. When the data pre-processing module 410 receives the training data 400, it may pre-process, at 405, the training data in a way as, e.g., required by the training process. For instance, the received training data may be reformatted, or certain features of the training data may be extracted. It is then determined, at 412, whether additional processing is needed. If additional processing of the pre-processed training data is needed, one or more modules 420-450 may be invoked to further process the data prior to being used for training. That is, one or more steps 415, 425, 435, and 445 may be performed to, e.g., remove outliers in the training data at 415, normalize the training data at 425, encode the training data at 435, and scale the training data at 445 to generate the training data to be sent to the ML system 460. If it is determined at 412 that no additional processing is needed, the pre-processed training data is sent to the ML system 460 without further processing.

When the ML system 460 receives the processed training data, it performs, at 455, machine learning based on the received training data in an iterative learning process until some predetermined convergence condition is met, as determined at 465. During this iterative process, the parameters for the prediction models are continually refined or adjusted by, e.g., minimizing some defined risk functions. Upon convergence, the trained parameters associated with the prediction models are used to generate, at 475, the prediction models 340, which can then subsequently be used for predicting content insertion parameters based on prediction input related to the content inventory.

Figure 5A:
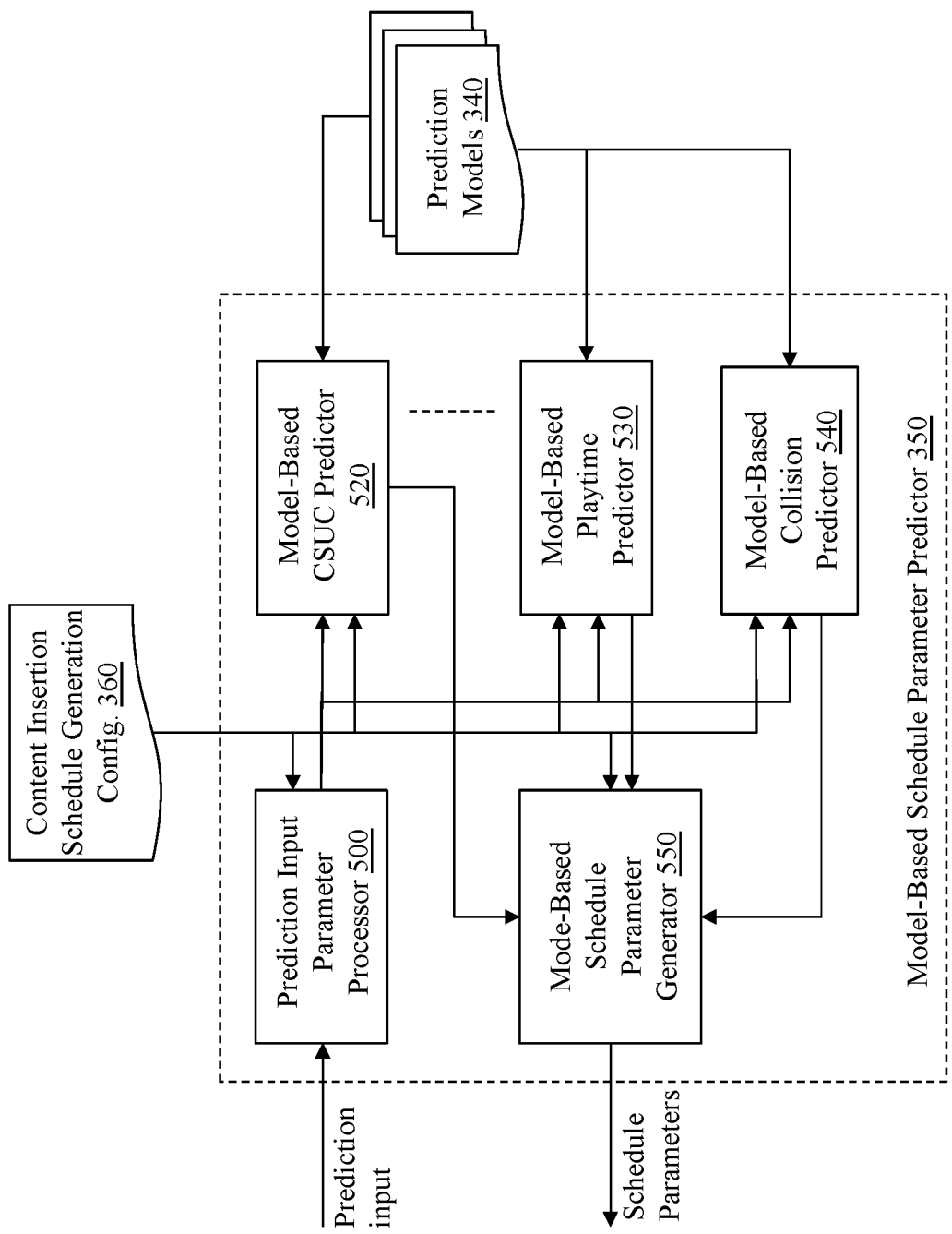
FIG. 5A depicts an exemplary high level system diagram for a model-based schedule parameter predictor, in accordance with an exemplary embodiment of the present teaching.

FIG. 5A depicts an exemplary high level system diagram of the model-based schedule parameter predictor 350, in accordance with an exemplary embodiment of the present teaching. In this illustrated embodiment, the model-based schedule parameter predictor 350 comprises a prediction input parameter processor 500, a plurality of model-based predictors 520, ..., 530, 540, and a model-based schedule parameter generator 550. The plurality of model-based predictors is provided to predict different content insertion related parameters based on prediction models stored in 340 that are previously trained via machine learning based on historic data. In this illustrated embodiment, the plurality of model-based predictors includes a model-based CSUC predictor 520, a model-based playtime predictor 530, and a model-based collision predictor 540. In some embodiments, each of the operational units in the model-based schedule parameter predictor 350 functions in accordance with the mode of operation specified by the content insertion schedule generation configuration in 360. For example, if it is configured that the operation is for daily predictions, then each of the units therein needs to operate accordingly, e.g., the model-based predictors 520, ..., 530, and 540 are to retrieve prediction models trained for making daily predictions and the model-based schedule parameter generator 550 is to function to generate the prediction parameters for, e.g., next day content insertion.

Figure 5B:
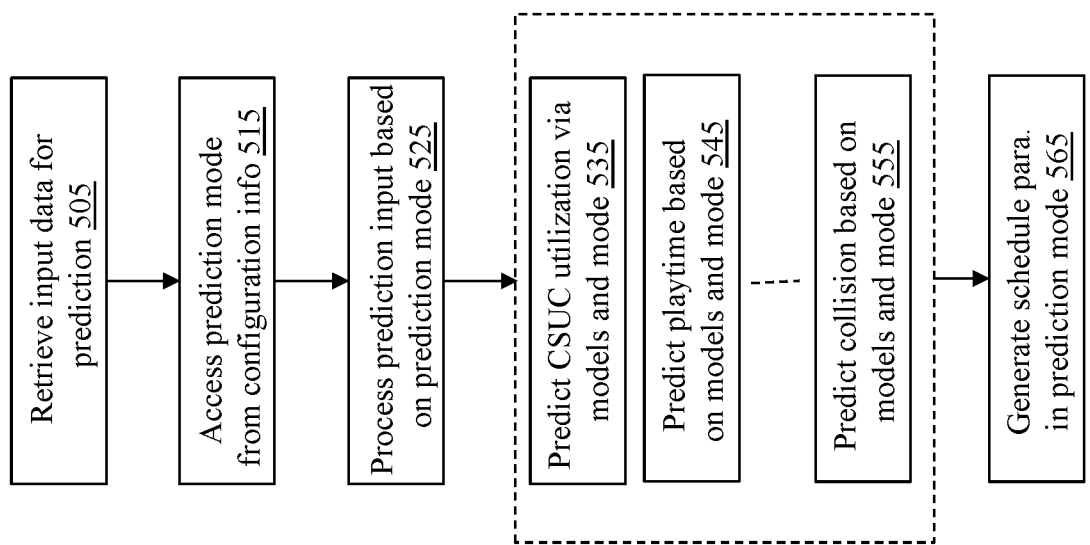
FIG. 5B is a flowchart of an exemplary process of a model-based schedule parameter predictor, in accordance with an exemplary embodiment of the present teaching.

FIG. 5B is a flowchart of an exemplary process of the model-based schedule parameter predictor 350, in accordance with an exemplary embodiment of the present teaching. When the prediction input parameter processor 500 receives, at 505, a prediction input, it proceeds to access, at 515, information (such as prediction mode) from the content insertion schedule generation configuration 360. Based on the specification in the configuration, the prediction input parameter processor 500 processes, at 525, the prediction input in accordance with the prediction mode information. Based on the configuration specification, the prediction input parameter processor 500 may also activate appropriate model-based predictors. In some embodiments, the decision of which model-based predictor(s) to activate may also be based on the information specified in the content insertion schedule generation configuration 360. For instance, in certain applications, the content insertion parameters to be predicted and used in generating content insertion schedules may include the predicted CSUC occupancy, the play start time, as well as predicted collisions. In this case, the model-based CSUC predictor 520, the model-based playtime predictor 530, and the model-based collision predictor 540 are activated. Some applications may operate based on predictions on the CSUC occupancy and the estimated play start time. In this case, the model-based predictors 520 and 530 may be activated but not 540. The activated prediction model(s) may operate individually or independently.

Each activated model-based predictor may also operate based on specified configuration information from 360, e.g., operation mode as well as certain parameters associated with the prediction input. For example, if the specified operation mode is for predicting insertion opportunities on a daily basis, the invoked model-based predictors may retrieve the prediction models trained for daily predictions. If the prediction input associated with some content inventory specifies that it is linked to a particular geographical region, each invoked model-based predictor may also retrieve prediction models from 340 that are trained for predicting insertion parameters for that region based on training data related to that region. The activated model-based predictor(s) then predicts, at any of the steps 535, 545, . . . , 555, the respective prediction related parameters based on appropriate prediction models as well as the input of the inventory in accordance with the specification in the configuration 360. The predicted content insertion parameters from the activated model-based predictors are then output to the model-based schedule parameter generator 550, where the schedule related insertion parameters are generated at 565 and output to the content insertion schedule generator 370, as shown in FIG. 3A.

Figure 6A:
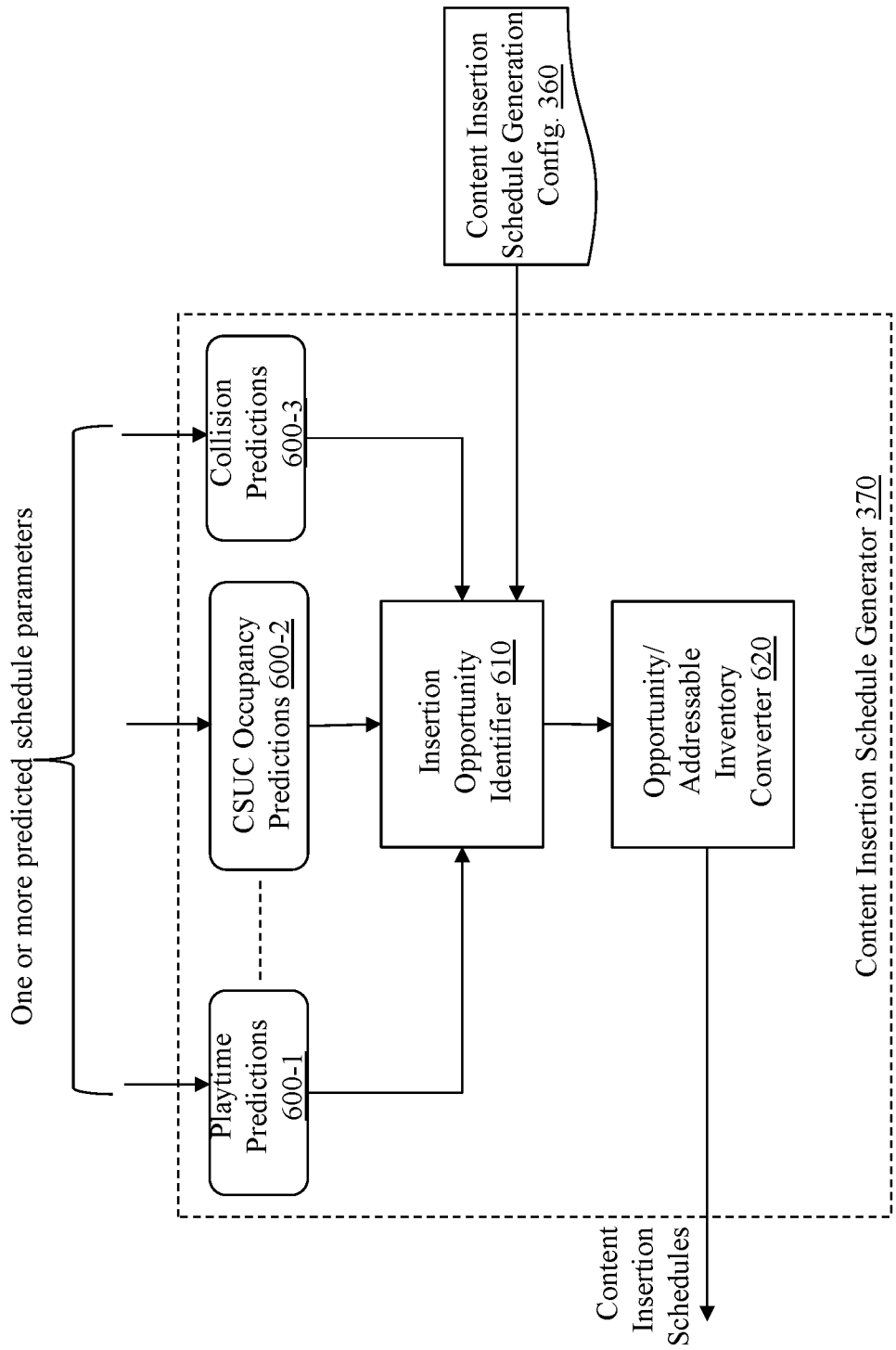
FIG. 6A depicts an exemplary high level system diagram of a content insertion schedule generator, according to an embodiment of the present teaching.

FIG. 6A depicts an exemplary high level system diagram of the content insertion schedule generator 370, according to an embodiment of the present teaching. The content insertion schedule generator 370 may be provided to integrate different predicted insertion parameters in order to identify content insertion spots and then generate accordingly the content insertion schedules for inserting content streams into the identified spots in different CSUCs of various adapters to increase content stream insertions and enhance the utilization of CSUCs. In this illustrated embodiment, the content insertion schedule generator 370 comprises an insertion opportunity identifier 610 and an opportunity/addressable inventory converter 620. The insertion opportunity identifier 610 is provided for selecting insertion spots in CSUCs of different adapters based on input schedule parameters 600 (e.g., play start time predictions 600-1, CSUC occupancy predictions 600-2, and collision predictions 600-3) received from the model-based schedule parameter predictor 350. The input schedule parameters as predicted may point to possible or candidate opportunities for content insertion. The insertion opportunity identifier 610 may select some insertion positions from these candidate insertion opportunities by integrating predictions with various considerations and priorities. In operation, for each of the selected insertion spot, the opportunity/addressable inventory converter 620 then generates a content insertion schedule and storing the same in storage 230 so that it may be used to perform the actual insertion (see FIG. 1). The schedule-based content insertion unit 240 in FIG. 1 may then follow the insertion schedule and insert content from inventory into a specified CSUS at a specified time according to the content insertion schedule.

Figure 6B:
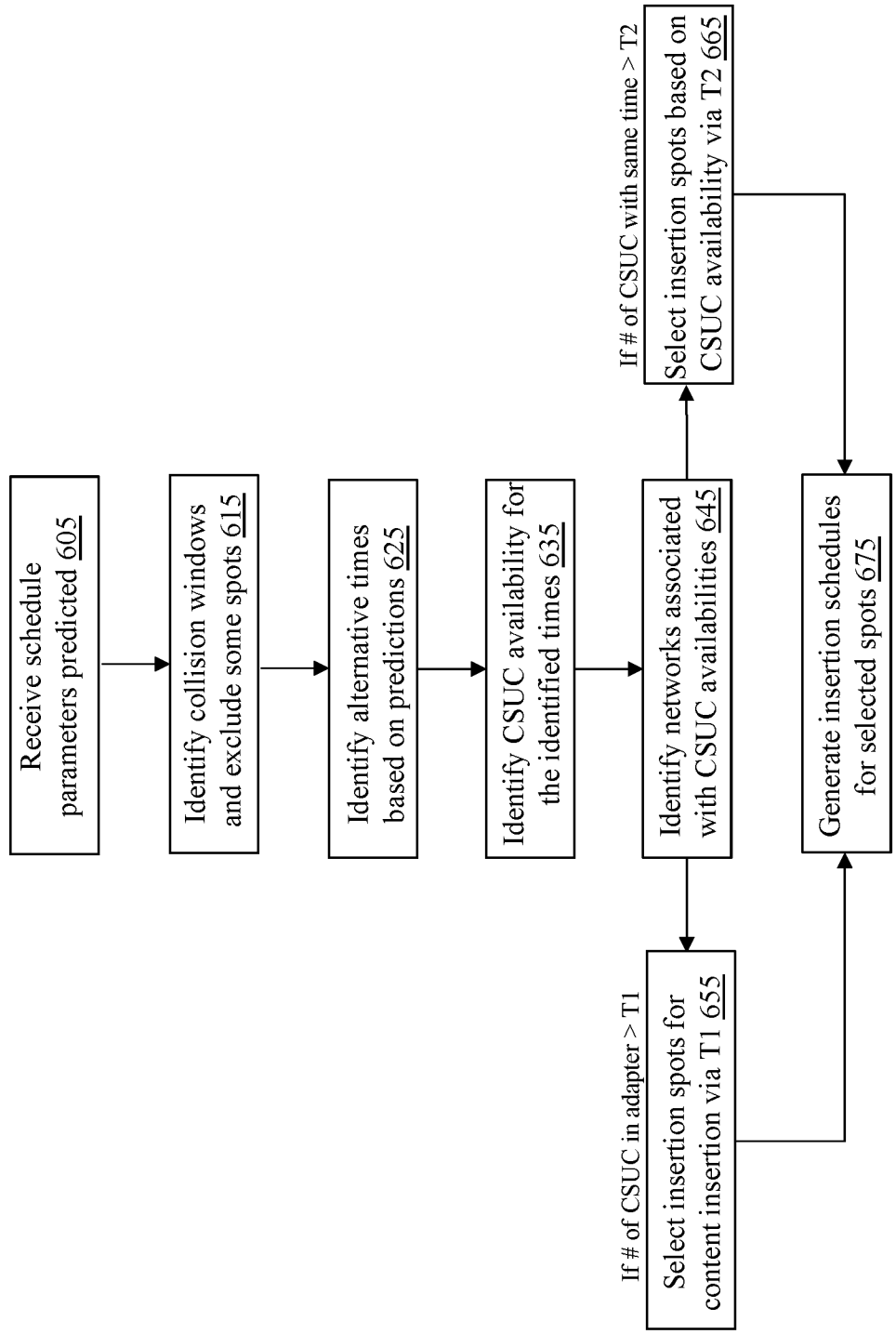
FIG. 6B is a flowchart of an exemplary process of a content insertion schedule generator, according to an embodiment of the present teaching.

FIG. 6B is a flowchart of an exemplary process of the content insertion schedule generator 370, according to an embodiment of the present teaching. The insertion opportunity identifier 610 first receives, at 605, the schedule parameters from the model-based schedule parameter predictor 350 (see FIG. 3A). If the collision predictions are present, with respect to each collision prediction, the insertion opportunity identifier 610 may identify, at 615, a collision window around the predicted collision and may exclude any predicted opportunities falling within the collision window.

With respect to the remaining predicted opportunities after the collision-based exclusion, the insertion opportunity identifier 610 may identify insertion spots. In some embodiments, play start time predictions may be used to determine, at 625, candidate play start (or insertion) times. Based on such identified candidate insertion times, the insertion opportunity identifier 610 may then proceed to identify, at 635, candidate CSUCs from CSUCs predictions that are available at the identified candidate play start times as well as, at 645, the networks associated with the candidate CSUCs. In some situations, there may be more than one networks available at the play start time than the number of candidate CSUCs. If that happens, certain networks may be selected for content insertion in accordance with some criterion. For instance, a network that has the highest number of estimated impressions predicted for a certain day and time according to the historic records may be selected for insertions to maximize the potential financial return.

In some embodiments, the so far identified candidate insertion spots in candidate CSUCs of associated networks may be optionally filtered based on additional conditions/criteria. For example, if the bandwidth of available CSUCs in a particular adapter exceeds a threshold, say T1, insertion spots in the candidate CSUCs in that adapter may be selected. This is performed at 655. As another example, when the number of candidate CSUCs in an adapter predicted available around the same play start time exceeds another threshold, say T2, then insertion spots in these CSUCs may be selected. This is performed at 665. Once the insertion spots are selected based on the predicted schedule parameters from the model-based schedule parameter predictor 350, the opportunity/addressable inventory converter 620 (in the content insertion schedule generator 370) converts such identified insertion opportunities into addressable inventory by generating, at 675, content insertion schedules for these selected insertion spots.

Referring back to FIG. 1, once the content insertion schedules in 230 (generated by the model-based content insertion schedule generator 220) are generated, they may then be used by the schedule-based content insertion unit 240 to insert content streams from the content inventory 210 into the selected CSUCs at predicted play start times as specified by the content insertion schedules 230. As discussed herein, with such content streams inserted into the CSUCs of different adapters, the content delivery mechanism 250 delivers the inserted content streams to different destinations 270 at their respectively scheduled times. Thus, the present teaching improves utilization of content delivery mechanism through automated predictions of content delivery parameters via prediction models trained based on historical data, enabling exploration of available content delivery resources (e.g., CSUCs, adapters, networks, etc.) to increase content insertion opportunities, and causing the content delivery mechanism to transmit additional content streams to destinations connected thereto.

Figure 7:
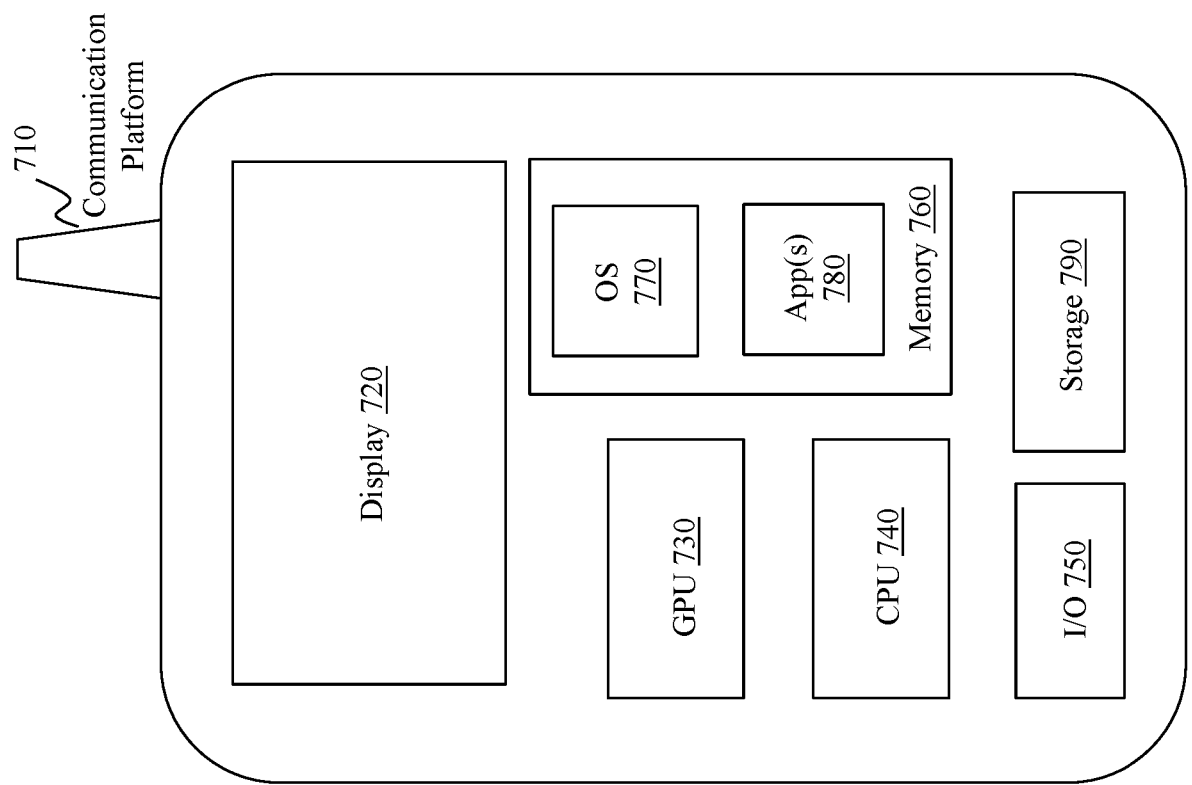
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or a mobile computational unit in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.) and one or more applications 780 may be loaded into memory 760 from storage 790 in order to be executed by the CPU 740. The applications 780 may include a user interface or any other suitable mobile apps for information exchange, analytics, and management according to the present teaching on, at least partially, the mobile device 700. User interactions, if any, may be achieved via the I/O devices 750 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information processing and analytical method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:
   receiving a prediction input characterizing utilization of a plurality of content stream utilization channels (CSUCs);
   predicting automatically one or more schedule parameters based on the prediction input via one or more of multiple different prediction models obtained via machine learning based on training data that is generated based on historic data related to content delivery via the plurality of CSUCs, wherein the one or more schedule parameters comprise a CSUC occupancy prediction associated with a time frame in a geographical region and/or in an adapter, wherein the historic data is grouped in accordance with some criterion determined based on operational modes in which the multiple different prediction models are to operate, and wherein the multiple different prediction models are trained based on different groups of historic data, respectively;
   identifying, based on the one or more schedule parameters, at least one insertion opportunity with respect to at least one CSUC;
   generating, for each of the at least one insertion opportunity, a corresponding insertion schedule specifying insertion of a content stream into a selected CSUC at an insertion time; and
   updating the training data based on content insertion schedules generated according to predictions made based on the one or more of multiple different prediction models, wherein the one or more of multiple different prediction models are updated based on the updated training data.

2. The method of claim 1, wherein the one or more schedule parameters relate to candidate insertion opportunities and further include at least one of:
   a start time prediction;
   and
   a collision prediction.

3. The method of claim 1, wherein the multiple different prediction models include:
   a start time prediction model;
   a CSUC occupancy prediction model; and
   a collision prediction model.

4. The method of claim 1, wherein:
   the historic data is collected by one or more sources;
   the grouped historic data is processed to generate training data, which is used to learn the multiple different prediction models in an iterative process; and
   the multiple different prediction models are generated based on the learning result.

5. The method of claim 4, wherein the grouped historic data is processed via one or more of:
   removing each outlier from the historic data;
   normalizing the historic data;
   encoding the historic data; and
   scaling the historic data.

6. The method of claim 2, wherein the step of identifying comprises:
   excluding each candidate insertion opportunity that is within a collision window defined based on a collision prediction to generate a remaining set of candidate insertion opportunities;
   for each start time prediction in the remaining set of candidate insertion opportunities,
      determining CSUC availability with respect to the start time prediction based on CSUC occupancy predictions in the remaining set of candidate insertion opportunities, and
      selecting an insertion opportunity with respect to the CSUC availability in accordance with some predetermined criteria.

7. The method of claim 1, further comprising inserting, according to each insertion schedule, a specified content stream into a selected CSUC at a designated insertion time.

8. A machine readable and non-transitory medium having information recorded thereon, wherein, when the information is read by the machine, causes the machine to perform the following:
   receiving a prediction input characterizing utilization of a plurality of content stream utilization channels (CSUCs);
   predicting automatically one or more schedule parameters based on the prediction input via one or more of multiple different prediction models obtained via machine learning based on training data that is generated based on historic data related to content delivery via the plurality of CSUCs, wherein the one or more schedule parameters comprise a CSUC occupancy prediction associated with a time frame in a geographical region and/or in an adapter, wherein the historic data is grouped in accordance with some criterion determined based on operational modes in which the multiple different prediction models are to operate, and wherein the multiple different prediction models are trained based on different groups of historic data, respectively;
   identifying, based on the one or more schedule parameters, at least one insertion opportunity with respect to at least one CSUC;
   generating, for each of the at least one insertion opportunity, a corresponding insertion schedule specifying insertion of a content stream into a selected CSUC at an insertion time; and
   updating the training data based on content insertion schedules generated according to predictions made based on the one or more of multiple different prediction models, wherein the one or more of multiple different prediction models are updated based on the updated training data.

9. The medium of claim 8, wherein the one or more schedule parameters relate to candidate insertion opportunities and further include at least one of:
   a start time prediction;
   and
   a collision prediction.

10. The medium of claim 8, wherein the multiple different prediction models include:
    a start time prediction model;
    a CSUC occupancy prediction model; and
    a collision prediction model.

11. The medium of claim 8, wherein:
    the historic data is collected by one or more sources;
    the grouped historic data is processed to generate training data which is used to learn the multiple different prediction models in an iterative process; and the multiple different prediction models are generated based on the learning result.

12. The medium of claim 11, wherein the grouped data is processed via one or more of:
removing each outlier from the historic data;
normalizing the historic data;
encoding the historic data; and
scaling the historic data.

13. The medium of claim 9, wherein the step of identifying comprises:
excluding each candidate insertion opportunity that is within a collision window defined based on a collision prediction to generate a remaining set of candidate insertion opportunities;
for each start time prediction in the remaining set of candidate insertion opportunities,
determining CSUC availability with respect to the start time prediction based on CSUC occupancy predictions in the remaining set of candidate insertion opportunities, and
selecting an insertion opportunity with respect to the CSUC availability in accordance with some predetermined criteria.

14. The medium of claim 8, wherein the information, when read by the machine, further causes the machine to perform inserting, according to each insertion schedule, a specified content stream into a selected CSUC at a designated insertion time.

15. A system, comprising:
a model-based schedule parameter predictor implemented on a processor and configured for
receiving a prediction input characterizing utilization of a plurality of content stream utilization channels (CSUCs), and
predicting automatically one or more schedule parameters based on the prediction input via one or more of multiple different prediction models obtained via machine learning based on training data that is generated based on historic data related to content delivery via the plurality of CSUCs, wherein the one or more schedule parameters comprise a CSUC occupancy prediction associated with a time frame in a geographical region and/or in an adapter, wherein the historic data is grouped in accordance with some criterion determined based on operational modes in which the multiple different prediction models are to operate, and wherein the multiple different prediction models are trained based on different groups of historic data, respectively;
a content insertion schedule generator implemented on a processor and configured for
identifying, based on the one or more schedule parameters, at least one insertion opportunity with respect to at least one CSUC, and
generating, for each of the at least one insertion opportunity, a corresponding insertion schedule specifying insertion of a content stream into a selected CSUC at an insertion time; and
a dynamic data collector implemented on a processor and configured for
updating the training data based on content insertion schedules generated according to predictions made based on the one or more of multiple different prediction models, wherein the one or more of multiple different prediction models are updated based on the updated training data.

16. The system of claim 15, wherein
the one or more schedule parameters relate to candidate insertion opportunities and further include at least one of a start time prediction and a collision prediction; and
the multiple different prediction models include a start time prediction model, a CSUC occupancy prediction model, and a collision prediction model.

17. The system of claim 15, further comprising a machine learning engine implemented on a processor and configured for obtaining, via machine learning, the multiple different prediction models based on training data derived by:
receiving grouping the historic data collected by one or more sources;
processing the grouped historic data to generate the training data;
learning the multiple different prediction models based on the training data in an iterative process; and
generating the multiple different prediction models based on the learning result.

18. The system of claim 17, wherein the machine learning engine comprises one or more of:
a first unit implemented on a processor and configured for removing each outlier from the historic data;
a second unit implemented on a processor and configured for normalizing the historic data;
a third unit implemented on a processor and configured for encoding the historic data; and
a fourth unit implemented on a processor and configured for scaling the historic data.

19. The system of claim 15, wherein the content insertion schedule generator is further configured for identifying the at least one insertion opportunity by:
excluding each candidate insertion opportunity that is within a collision window defined based on a collision prediction to generate a remaining set of candidate insertion opportunities;
for each start time prediction in the remaining set of candidate insertion opportunities,
determining CSUC availability with respect to the start time prediction based on CSUC occupancy predictions in the remaining set of candidate insertion opportunities, and
selecting an insertion opportunity with respect to the CSUC availability in accordance with some predetermined criteria.

20. The system of claim 15, further comprising a schedule-based content insertion unit implemented on a processor and configured for inserting, according to each insertion schedule, a specified content stream into a selected CSUC at a designated insertion time.

* * * * *